(12) United States Patent
Hedges

(10) Patent No.: US 7,981,193 B2
(45) Date of Patent: Jul. 19, 2011

(54) METHOD OF CONTROLLING A GAS SEPARATING APPARATUS

(75) Inventor: Peter Hedges, Dorchester (GB)

(73) Assignee: Honeywell Normalair-Garrett (Holdings) Limited, Somerset (GB)

(*) Notice: Subject to any disclaimer, the term of this patent is extended or adjusted under 35 U.S.C. 154(b) by 903 days.

(21) Appl. No.: 11/685,834

(22) Filed: Mar. 14, 2007

(65) Prior Publication Data

US 2007/0214954 A1 Sep. 20, 2007

(30) Foreign Application Priority Data

Mar. 15, 2006 (GB) .................................. 0605178.3

(51) Int. Cl.
*B01D 46/46* (2006.01)

(52) U.S. Cl. ...... 95/8; 95/1; 95/19; 96/421; 128/204.23; 128/204.26

(58) Field of Classification Search .................... 95/1, 8, 95/19; 96/421; 128/204.23, 204.26
See application file for complete search history.

(56) References Cited

U.S. PATENT DOCUMENTS

| | | | |
|---|---|---|---|
| 3,750,473 A * | 8/1973 | Bennett et al. | .................. 73/387 |
| 4,292,671 A * | 9/1981 | Evans et al. | ........................ 701/4 |
| 6,371,114 B1 * | 4/2002 | Schmidt et al. | .......... 128/204.23 |

FOREIGN PATENT DOCUMENTS

| EP | 0391607 | 10/1990 |
|---|---|---|
| GB | 2225964 | 6/1990 |

OTHER PUBLICATIONS

Carlson (Supplemental Oxygen for the General Aviation Pilot) 1998, <http://www.dr-amy.com/rich/oxygen/>.*
Bequette ("Process Control: Modeling, Design and Simulation") Prentice Hall 2003, pp. 155-160 and 168-172.*
Beh et al. "The Control of the Vacuum Swing Adsorption Process for Air Separation" from Adsorption Science and Technology Proceedings of the Second Pacific Basin Conference Brisbane, Australia, May 14-18, 2000 Do (University of Queensland) pp. 663-667.*

* cited by examiner

*Primary Examiner* — Jason M Greene
*Assistant Examiner* — Anthony Shumate
(74) *Attorney, Agent, or Firm* — Stites & Harbison PLLC; Douglas E. Jackson

(57) ABSTRACT

A method of controlling an apparatus for separating product gas and non product gas from an air supply, the concentration of the product gas produced by the apparatus being variable depending on a control signal from a controller and the efficiency of the apparatus in producing product gas depending upon an environmental parameter, the method including sensing the oxygen concentration in the product gas produced by the apparatus, determining an instantaneous demand for oxygen concentration in the product gas, providing to the controller a process variable signal indicative of the sensed concentration of the oxygen in the product gas, and providing to the controller a demand input signal indicative of the demand, sensing the environmental parameter and providing an environmental parameter input signal to the controller, comparing the process variable signal and the demand signal to generate an error signal indicative of a change in oxygen concentration in the product gas required to match the instantaneous demand, conditioning the error signal to derive a control signal to control the apparatus to satisfy the demand, characterised in that the conditioning of the error signal is compensated to derive the control signal, depending upon the environmental parameter input signal.

7 Claims, 2 Drawing Sheets

METHOD OF CONTROLLING A GAS SEPARATING APPARATUS

This invention relates to a method of controlling an apparatus for separating product gas, such as oxygen for breathing, and non product gas, from an air supply. More particularly but not exclusively the method is used to control a separating apparatus which is a pressure swing adsorption oxygen concentrating apparatus of the kind which is provided on board an aircraft to provide a breathing gas supply for use by aircrew. Such an apparatus is known as an on board oxygen generating apparatus or "OBOG"

Typically an OBOG is operated in a continuous cycle of charging and venting. During each charging phase an air supply, such as a high pressure air supply bled from a compressor section of a gas turbine engine, is fed into the OBOG, and a bed of adsorption material therein, such as Zeolite, adsorbs primarily nitrogen from the air supply, passing oxygen to a product gas line for use. In each venting phase, the bed is isolated from the air supply and opened to a lower pressure i.e. the atmosphere, so that adsorbed nitrogen is purged from the bed to atmosphere.

In a typical arrangement, each such charging and venting cycle may take in the order of 10 seconds before being repeated. The phases may be coordinated with charging and venting of one or more other OBOGs to enable a continuous stream of oxygen to be produced.

It will be appreciated that in an aircraft, the concentration of oxygen required will vary with aircraft altitude, and/or as the aircraft undergoes maneuvers which produce high G-forces on the aircrew.

To vary the concentration of oxygen in an effort to match demand, it is known to vary the actual durations or relative durations of the charging and venting phases, either by varying the overall cycle time, or by varying the relative proportions of the charging and venting phases within a constant cycle time depending upon the oxygen concentration sensed in the product gas. In each case it will be appreciated that the OBOG will take some time before reacting to any change with the result that it may take a significant time for the concentration of oxygen in the product gas supply line to change to meet a new demand. It is known to apply control algorithms to maximize system stability, e.g. in conditions where demand is rapidly changing.

Typically, to sense the oxygen concentration, a sample of the product gas is provided to an oxygen concentration sensor which also requires a finite time to sense the oxygen concentration, thereby adding to the delay between demand changing and the OBOG reacting by providing an increased or reduced concentration of product gas, thereby resulting in a pilot for example, receiving too much or too little oxygen for instantaneous conditions.

This is because during a charging/venting cycle, in a product gas line, there may be large pressure swings and varying oxygen concentrations. In order to obtain an accurate determination of the oxygen concentration, the sample presented to the oxygen concentration sensor needs to represent an average oxygen concentration over a measurement time. Thus the sample may need to be isolated from the product gas line during measurement which causes measurement delays in addition to those created by the cyclic nature of the apparatus.

According to the invention we provide a method of controlling an apparatus for separating product gas and non product gas from an air supply, the concentration of the product gas produced by the apparatus being variable depending on a control signal from a controller and the efficiency of the apparatus in producing product gas depending upon an environmental parameter, the method including sensing the oxygen concentration in the product gas produced by the apparatus, determining an instantaneous demand for oxygen concentration in the product gas, providing to the controller a process variable signal indicative of the sensed concentration of the oxygen in the product gas, and providing to the controller a demand input signal indicative of the demand, sensing the environmental parameter and providing an environmental parameter input signal to the controller, comparing the process variable signal and the demand signal to generate an error signal indicative of a change in oxygen concentration in the product gas required to match the instantaneous demand, conditioning the error signal to derive a control signal to control the apparatus to satisfy the demand, characterized in that the conditioning of the error signal is compensated to derive the control signal, depending upon the environmental parameter input signal.

It has been found that the efficiency of an apparatus for separating product gas, such as oxygen for breathing, and non product gas, from an air supply, and particularly but not exclusively in an OBOG, varies significantly with changing altitude, air supply temperature and other environmental parameters. For example for the same charging and venting ratio and cycle duration, an OBOG could produce oxygen concentrations two to three times higher at high altitude than at lower altitude, mainly due to the greater venting efficiency at high altitude, when the OBOG adsorption bed is opened to the atmosphere.

In a conventional control method, such variations in OBOG efficiency are not specifically accommodated, but solely any discrepancy between demand and concentration of the gas produced is used as a means of control, whereas utilizing the present invention, the control method takes into account the environmental parameter sensed, in conditioning the error signal and thereby providing the control signal with compensation, to control the apparatus.

As a result, the apparatus is able to be controlled to produce product gas at a concentration more closely matching instantaneous demand than in known control methods which do not compensate for changing environmental parameters.

The invention is particularly but not exclusively for controlling one or more pressure swing gas adsorption oxygen concentrating apparatus of the kind which are provided on board an aircraft to provide a breathing gas supply for use by aircrew.

An inlet valve may be provided for the or each apparatus which may be opened by the controller to permit air from the air supply into the apparatus, and a venting valve may be provided which is openable by the controller for venting the apparatus. Alternatively a combined inlet and venting valve is provided for the or each apparatus, which may either permit inlet of air from an air supply into the apparatus or permit venting of the apparatus.

The environmental parameter is preferably altitude in which case the method may include sensing the altitude with an altimeter to provide the environmental input signal to the controller.

The controller may compensate for the environmental parameter by different methods. For example the controller may reference data e.g. contained in a look-up table, which correlates the operating efficiency of the apparatus with the sensed environmental parameter, and the method includes utilizing the reference data in deriving the control signal which thus appropriately compensates for the environmental parameter.

Embodiments of the invention will now be described with reference to the accompanying drawings in which:—

Figure 1:
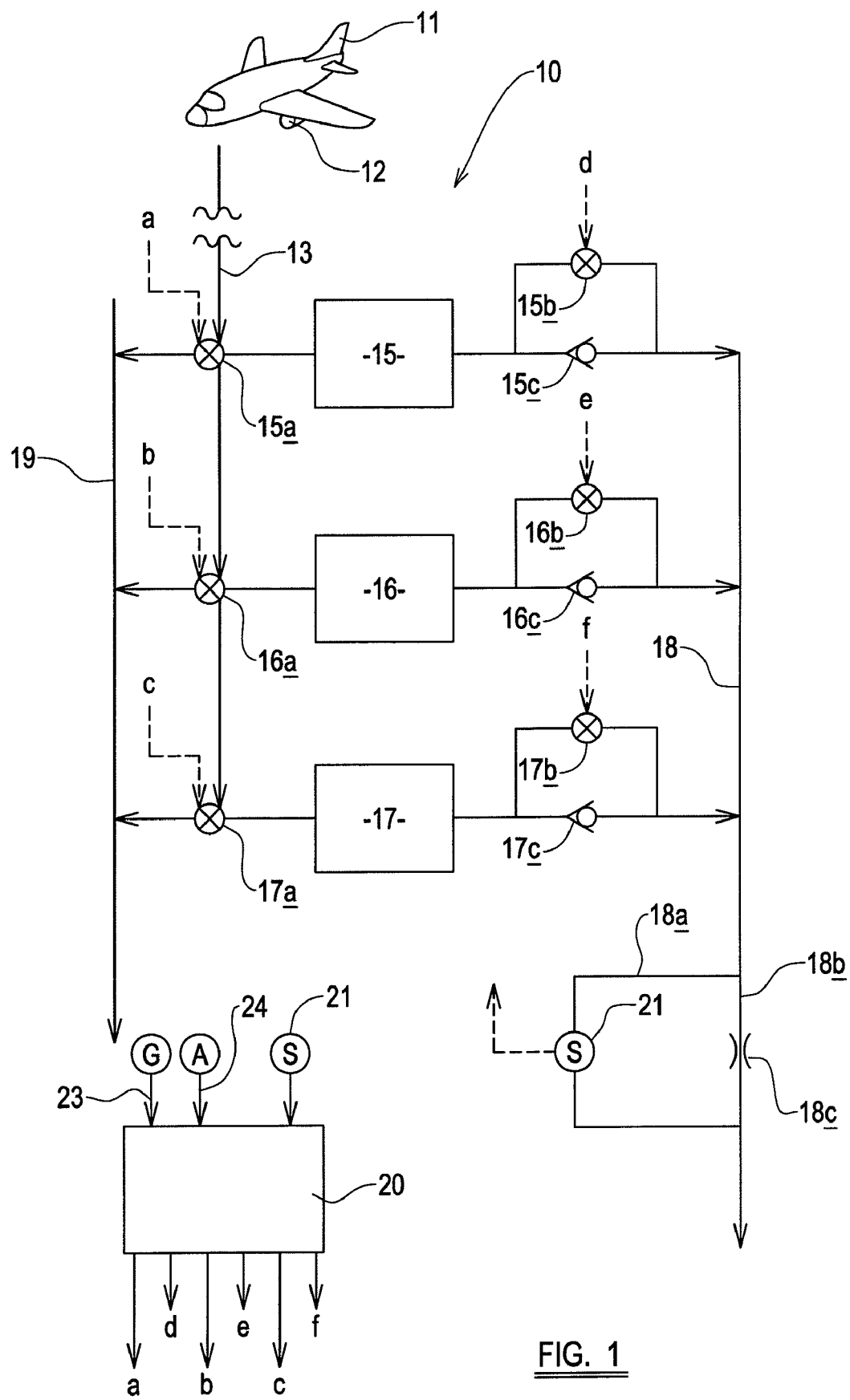
FIG. 1 is an illustrative view of a system including a plurality of pressure swing gas adsorption apparatus which may be operated in accordance with the present invention.

Referring to FIG. 1 a system 10 for separating oxygen and non-oxygen gas from a high pressure air supply, to produce oxygen as a product gas is shown. Such a system 10 is provided in an aircraft 11, the air supply being derived from a compressor section of a gas turbine engine 12.

The air supply is fed to a supply line 13 to which each of three pressure swing gas adsorption apparatus 15, 16, 17 are connected via respective valves 15a, 16a, 17a. The valves 15a, 16a, 17a are each electrically operated valves which are controlled by a controller 20 via respective control lines a, b, c.

Each pressure swing gas adsorption apparatus 15, 16, 17 contains a bed of adsorptive material such as Zeolite, which when the respective valve 15a, 16a, 17a connects the air supply line 13 such that air flow into the respective bed or beds, the bed or beds adsorb non-oxygen gas, whilst allowing oxygen gas to pass to a product gas line 18, via a respective non-return valve 15c, 16c, 17c. Thus product gas is provided for use in a downstream system for breathing by an aircrew of the aircraft 11.

The valves 15a, 16a, 17a are three way valves which may alternatively each be operated by the controller 20 to connect the respective bed of the apparatus 15, 16, 17 to a vent line 19 which opens to the lower pressure external atmosphere whilst the valves 15a, 16a, 17a isolate the air supply line 13 from the respective apparatus 15, 16, 17 adsorptive beds, or to connect the respective beds of the apparatus 15, 16, 17 to the air supply line 13 whilst isolating the apparatus 15, 16, 17 from the vent line 19.

Thus in a respective charging phase each apparatus 15, 16, 17 may produce oxygen gas, or concentrate oxygen gas, from the air supply 13, and in a respective venting phase the nitrogen primarily which during charging was adsorbed by the respective bed, may be purged from the respective apparatus 15, 16, 17.

To aid venting, if desired a small amount of product gas may be allowed to pass back though the respective apparatus 15, 16, 17 by opening a respective electrically controlled purge valve 15b, 16b, 17b, this being achieved by the controller 20 signaling the respective purge valve 15b, 16b, 17b along a respective control line d, e or f. In yet another configuration, the valves 15b, 16b, 17b may be operated as dump valves by opening a respective valve 15b, 16b, 17b whilst a respective bed is receiving air from the air supply 13, to increase air flow through the respective bed 15, 16, 17.

The system 10 further includes an oxygen concentration sensor (S) 21 past which a proportion of the product gas may pass, to sense the concentration of the oxygen being produced by the system 10. In the example, the sensor 21 is provided in a branch 18a, branching from the remaining product gas line 18b having a flow restriction 18c, into which sample gas is bled via an orifice. After sensing, the sample gas is vented to atmosphere.

Figure 2:
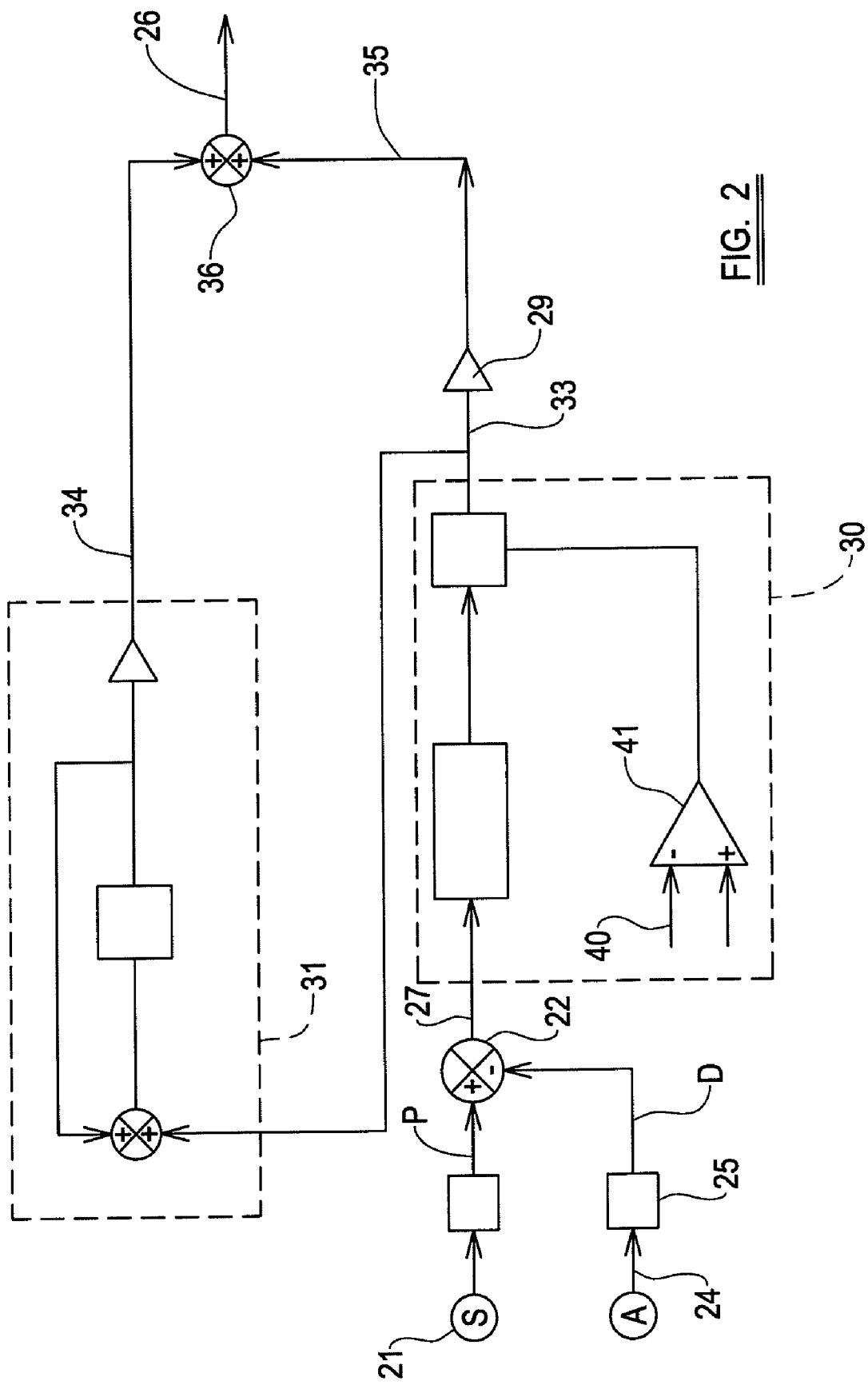
FIG. 2 is a diagrammatic view of a control algorithm for controlling the apparatus of FIG. 1 in accordance with the present invention.

Referring now to FIG. 2 a control algorithm 25, is diagrammatically shown. This essentially utilizes known proportional and integral control ("PI" control) to provide an output signal at an output 26. The instantaneous demand for oxygen signal D, which will depend upon the aircraft's altitude and/or G-forces to which the aircrew are subject during aircraft maneuvers, is compared in a comparator 22 to a process variable signal P, which in this example is dependent upon the concentration of oxygen produced by the three apparatus 15, 16, 17 as sensed by the oxygen concentration sensor 21, which depends upon the system 10 performance. Thus the signal P, indicative of the concentration of oxygen produced by the system 10, is provided to the comparator 22, The demand signal D for oxygen in the example is derived in this example, from the output signal 24 from the altimeter A, the demand being a modified (amplified and conditioned) signal, or a demand signal calculated from the output signal 24 from the altimeter A or derived from a look-up table 25 which provides a demand signal D, dependent upon altitude. In another example, the demand signal D may include or solely depend on an input signal from a G-force sensor or determinator, and in FIG. 1, there is illustrated such a G-force sensor at G which provides such an input signal 23 to the controller 20. Thus the demand signal D may depend on altitude, or altitude and G force or only G force as required.

In each case an error signal 27 is produced which is indicative of any change in oxygen concentration required for the concentration of oxygen produced by the system 10 to match the demand signal D i.e. the error signal 27 is proportional to the instantaneous discrepancy between the demand signal D for oxygen and the concentration of oxygen produced signal P.

In a conventional arrangement, this proportional error signal 27 would be conditioned e.g. amplified by an amplifier 29 and used as a component for producing the output signal 26. However as described below, the proportional error signal 27 is conditioned in a gain section 30 of the algorithm to compensate for varying system performance due to an environmental factor, to provide a compensated error signal 33, which after amplification by the amplifier 29, (the amplified compensated proportional error signal being indicated at 35) is provided to an adder 36.

Between the gain section 30 and the amplifier 29, an input of the compensated error signal 33 to another control loop 31 is provided where an integral error signal 34 is derived which is proportional to the time and magnitude of the error between the demand signal D and the actual oxygen concentration.

The compensated proportional error signal 35 from amplifier 29 and the integral error signal 34 are combined in the adder 36 to produce the output signal 26 for use as hereinafter described.

PI" control algorithms are commonly used to control systems in which a constantly changing demand is required to be satisfied by a slow performance-changing system, in order to provide for stable control i.e. so that control is not solely effected in proportion to the error between actual oxygen concentration signal P and demand signal D. Such control algorithms may include derivative control too to superimpose on the proportional and integral error signals 35, 34, a derivative error signal which is proportional to the rate of change of the error between the demand signal D and the actual oxygen concentration signal P produced. Such control methodology is known as "PID" control.

In the system 10 for separating oxygen and non-oxygen gas to produce oxygen as a product gas shown in FIG. 1 however, an added complication is that the performance of the system 10 will change with changing environmental parameters, and in particular, but not exclusively, altitude.

This is largely because the efficiency of venting the adsorbing beds of the apparatus 15, 16, 17 is greater at high altitude, thereby improving overall the efficiency of the separation process in the apparatus 15, 16, 17.

Because the system 10 inherently reacts slowly to changing demand signal D for the reasons exemplified above, conventionally the system 10 would cope with such environmental factors only consequently i.e. as the oxygen concentration sensor 21 may sense enhanced oxygen concentrations in the produced gas produced at high altitude.

However in accordance with the present invention, the known "PI" algorithm is modified to compensate for the varying efficiency of the oxygen separation process due to changing environmental factors, primarily altitude.

In FIG. 1 it can be seen that the system 10 includes an altimeter A for determining the aircraft's altitude, which provides an environmental parameter input signal 24 to the controller 20, as well as the input which is used to determine demand signal D.

The controller 20 uses the environmental parameter input 24 to compensate for the varying efficiency of the separation process with altitude by varying gain applied to the proportional error signal 27 from the comparator 22.

The compensation applied will depend upon the altitude sensed by altimeter A which provides an environmental parameter input signal 40 within the gain section 30 of the algorithm.

The controller 20 may utilize reference data correlating the varying separation process efficiency with altitude. Such data may be provided in a look-up table. Alternatively the compensation may be applied depending upon a known calculated or empirically derived relationship between the varying separation process efficiency and altitude. In each case, the gain applied in gain section 30 is determined depending upon the environmental parameter.

In FIG. 2, it can be seen that an amplifier 41 receives environmental parameter input signal 40 from the altimeter A, but the gain of the error signal 27 is only changed as the altitude changes in steps of say, 10 ft, to prevent the gain being changed constantly.

By virtue of the "PI" or "PID" control algorithm and the gain compensation 30 applied depending on the environmental parameter, the output signal 26 may enable the controller 20 more rapidly and accurately to respond to changing demand signal D, to adjust the system 10 performance to satisfy the demand signal D.

Referring again to FIG. 1, it will be appreciated that typically the three pressure swing adsorption apparatus 15, 16, 17 would be operated in a coordinated way to achieve a desired oxygen concentration in the product gas line 18. Thus typically during an operating period, the three apparatus 15, 16, 17 may be operated so that at any time, at least one of the apparatus 15, 16, 17 is in charging phase and at least one other of the remaining two apparatus 15, 16, 17 is venting to ensure a constant oxygen supply in the product gas line 18.

The three apparatus 15, 16, 17 may be operated with the proportion of charging and venting durations remaining constant in an operating period, whilst the overall cycle times are changed, thus to vary the amount and concentration of oxygen produced and provided to the product gas line 18 depending on any discrepancy between demand signal D and the actual concentration of product gas sensed by sensor 21, with environmental factor compensation applied in gain section 30 of the control algorithm.

In another and preferred example, the charge/vent cycle time for each of the three apparatus 15, 16, 17 may be maintained constant within an operating period lasting for a plurality of cycles, but with the proportion of charge to vent cycle time for each apparatus 15, 16, 17 being varied by the controller 20 to vary the amount and concentration of oxygen produced and provided to the product gas line 18, depending on any discrepancy between demand signal D and the actual concentration of product gas sensed by sensor 21, with environmental factor compensation applied in gain section 30 of the control algorithm.

To achieve either such control, it will be appreciated that the output signal 26 from the algorithm requires processing by the controller 20 in order to provide appropriate control signals along control lines a to f to the various electrically operated valves 15a, 16a, 17a, 15b, 16b, 17b.

Various modifications may be made without departing from the scope of the invention.

For example, although the invention has been described as applied to a system 10 including a plurality of pressure swing adsorption gas separating apparatus 15, 16, 17 the invention may be applied to any other gas separating apparatus where the efficiency and performance of the separation process is dependent upon one or more environmental factors, such as altitude.

Although the environmental parameter of altitude is the most significant to the pressure swing adsorption apparatus 15, 16, 17 described, temperature of the air supply may be a significant factor too, in which case the gain of the error signal 27 between demand signal D and sensed oxygen concentration signal P (in the embodiment of the drawings) may be compensated for in the gain section 30 of the control algorithm depending on the temperature of the air supply which may change with altitude, engine 12 performance and other factors. Indeed the present invention is applicable wherever there is an environmental factor which may change the performance of the gas separation system, provided that the effect of the changing environmental parameter can be correlated to the performance of the separation system 10, so that appropriate gain compensation can be applied.

In the example described, the gain compensation is applied to the error signal 27 which is proportional to the difference between the demand signal D and the sensed oxygen concentration signal P, but in another example, compensation for a changing environmental parameter may otherwise be used in the control methodology to provide a control signal for use in controlling the system 10.

In a modification to the system 10 shown in FIG. 1, instead of the inlet valves 15a, 16a, and 17a of the pressure swing adsorption apparatus 15, 16, 17 being combined three-way valves which are alternatively operable to connect the adsorption beds of the apparatus 15, 16, 17 to the air supply 13 or to atmosphere 19, in another example, separate inlet and venting valves may be provided, which are preferably electrically controlled e.g. solenoid operated, valves independently controllable by the controller 20.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A method of controlling an oxygen concentration of a product gas produced by an apparatus for separating product gas and non product gas from an air supply and for delivering the product gas to a user for breathing, the oxygen concentration of the product gas produced by the apparatus being variable depending a) on a control signal and b) on the efficiency of the apparatus in producing product gas which depends upon an environmental parameter which changes and which effects the efficiency of the apparatus, the method comprising the steps of:

sensing the oxygen concentration in the product gas produced by the apparatus, determining an instantaneous demand for oxygen concentration in the product gas for breathing by the user, providing a process variable signal indicative of the sensed concentration of the oxygen in the product gas, and providing a demand input signal indicative of the instantaneous demand, sensing the environmental parameter and providing an environmental parameter input signal, comparing the process variable signal indicative of the sensed concentration of the oxygen in the product gas and the demand input signal indicative of the instantaneous demand to generate an error signal indicative of a change in oxygen concentration in the product gas required to match the instantaneous demand, and conditioning the error signal to derive the control signal and using the derived control signal to control the apparatus to satisfy the determined instantaneous demand, wherein said conditioning step includes compensating the error signal which is used to derive the control signal depending upon changes in the environmental parameter input signal which changes are correlated to the efficiency of the apparatus.

2. A method according to claim 1, further characterised in that the environmental parameter sensed is at least one of altitude and air supply temperature.

3. A method according to claim 2,
further characterised in that the environmental parameter which is sensed is altitude, and
the method further including the step of sensing the altitude with an altimeter to provide the environmental input signal to the controller.

4. A method according to claim 3,
further characterised in that the apparatus is provided in an aircraft, and
the method further includes the step of sensing the altitude of the aircraft to provide the environmental parameter input.

5. A method according to claim 4, further characterised in that the apparatus is at least one pressure swing gas adsorption oxygen concentrating apparatus, provided on board the aircraft to provide a breathing gas supply for use by aircrew.

6. A method according to claim 4, further characterised in that
an inlet valve is provided for the or each apparatus which is openable to permit air from the air supply into the apparatus, and
a venting valve is provided which is openable for venting the apparatus.

7. A method according to claim 1, further characterised in that the conditioning step includes compensating for the environmental parameter by referencing data which correlates an operating efficiency of the apparatus with the sensed environmental parameter.

* * * * *